(12) United States Patent
Lawlyes et al.

(10) Patent No.: US 6,447,342 B1
(45) Date of Patent: Sep. 10, 2002

(54) PRESSURE SENSOR CONNECTOR

(75) Inventors: Daniel A. Lawlyes, Kokomo, IN (US); Joseph M. Ratell, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/851,876

(22) Filed: May 10, 2001

(51) Int. Cl.[7] ............................................. H01R 13/502
(52) U.S. Cl. ........................... 439/686; 73/756; 73/153; 73/156; 439/638
(58) Field of Search ................................. 439/638, 620, 439/300; 73/720–726, 756

(56) References Cited

U.S. PATENT DOCUMENTS

| | | | |
|---|---|---|---|
| 4,571,717 A | * | 2/1986 | Reichel et al. .............. 439/638 |
| 4,952,529 A | * | 8/1990 | Grider .......................... 439/78 |
| 5,343,757 A | * | 9/1994 | Tate ............................. 73/724 |
| 5,386,730 A | * | 2/1995 | Ikeda et al. ................... 73/706 |
| 5,587,535 A | * | 12/1996 | Sasaki et al. ................. 73/726 |
| 5,756,899 A | * | 5/1998 | Ugai et al. .................... 73/725 |
| 5,802,912 A | * | 9/1998 | Pitzer et al. ................. 439/620 |

* cited by examiner

Primary Examiner—P. Austin Bradley
Assistant Examiner—Briggitte R. Hammond
(74) Attorney, Agent, or Firm—Jimmy L. Funke

(57) ABSTRACT

A pressure sensor connector (10) for use with a pressure sensor element (12) that includes a plurality of pressure sensor terminals (13). The pressure sensor connector (10) includes a cap (18), a plurality of connector terminals (20) and a frame element (22). A plurality of contacts (24), included in the frame element (22), connect each of the plurality of connector terminals (20) to a corresponding pressure sensor terminal (13).

21 Claims, 3 Drawing Sheets

PRESSURE SENSOR CONNECTOR

TECHNICAL FIELD

The present invention relates generally to a pressure sensor connector and more specifically to a pressure sensor connector with simplified assembly and reduced cost.

BACKGROUND OF THE INVENTION

Pressure sensors are well-known devices commonly utilized to monitor fluid pressure values or changes in such values. Often these sensors are fitted with components to facilitate installation and removal from larger components. Common pressure connectors take the form of a cap that attaches to the pressure sensor element and includes multiple terminals to allow the pressure sensor element to be easily connected to a wire harness or directly to other components.

These common connectors often must have multiple electrical pathways formed within the connector cap in order to accommodate the multiple terminals commonly required by pressure sensor assemblies. The necessity of electrical pathways within the connector cap is known to increase the cost and complexity of the connector. This is highly undesirable.

In addition to increasing the cost and complexity of connector manufacturing, present designs additionally can increase the cost and complexity of assembling the connector to the pressure sensor element (or cell). Commonly, wire bonding techniques are utilized to create the electrical pathway between the pressure sensor terminals and the connector. Although wire bonding is highly useful in connecting the connector to the pressure sensor element due to its low profile, it has the undesirable effect of increasing the cost and complexity of assembly. In addition, it is known wire bonds can become fragile as the distance the bonds span increases. This is also undesirable since it has the potential to negatively affect the durability of the pressure sensor assembly. Finally, the diminutive size of wire bonds combined with their sensitivity to length can require a precise alignment of the pressure sensor element within the connector to insure proper application. Again, these characteristics can serve to increase the cost and complexity of pressure sensor component assembly.

It would, therefore, be highly desirable to have a pressure sensor connector with reduced manufacturing costs and complexity. In addition, it would be highly desirable to have a pressure sensor connector that reduces the cost and complexity of attaching the connector to the pressure sensor element associated with many known designs.

SUMMARY OF THE INVENTION

It is therefore an object of the present invention to provide a pressure sensor connector that reduces the cost and complexity of manufacturing. It is a further object of the present invention to provide a pressure sensor connector that reduces the cost and complexity of attaching the connector to the pressure sensor element.

In accordance with the objects of this invention, a pressure sensor connector is provided. The pressure sensor connector is intended for use with a pressure sensor element that includes a plurality of pressure sensor terminals. The pressure sensor connector includes a cap. Formed within the cap are a plurality of connector terminals. The pressure sensor connector further includes a frame element. The frame element includes a plurality of contacts. Each of the plurality of contacts connects one of the plurality of connector terminals to a corresponding pressure sensor terminal.

Other objects and features of the present invention will become apparent when viewed in light of the detailed description of the preferred embodiment taken in conjunction with the attached drawings and appended claims.

DESCRIPTION OF THE EMBODIMENT(S)

Figure 1:
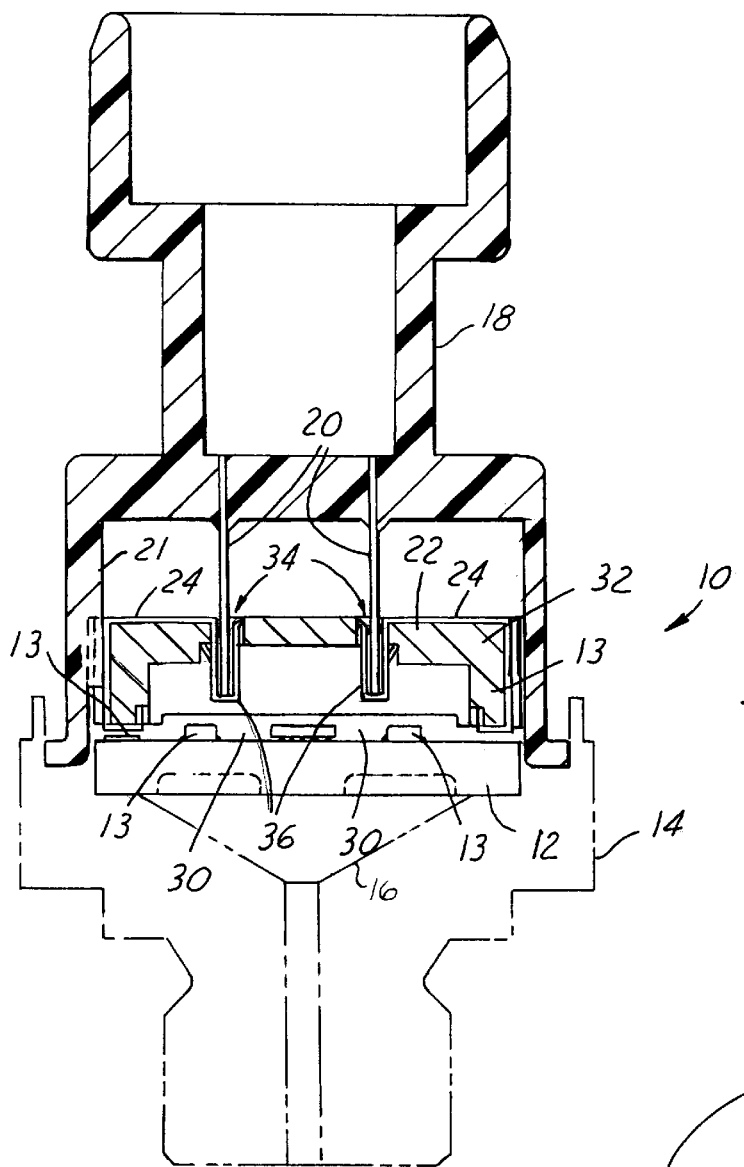
FIG. 1 is a cross-section of an embodiment of a pressure sensor assembly, including the pressure sensor connector in accordance with the present invention.

Referring now to FIG. 1, which is a cross-section of an embodiment of a pressure sensor assembly 11, including pressure sensor connector 10 in accordance with the present invention. The disclosed pressure sensor connector 10 is preferably for use in harsh environments, where it will likely be exposed to high temperatures, vibration, and corrosive fluids, such as the environment under the hood of motor vehicles. Such applications would include oil, brake fluid, refrigerant, coolant, transmission fluid, and air pressure sensors. However, the disclosed pressure sensor connector 10 may be used in a variety of applications, including non-automotive applications.

Figure 2:
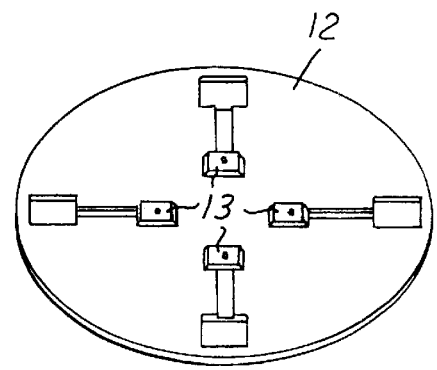
FIG. 2 is an illustration of a pressure sensor element (or cell) for use in the pressure sensor connector illustrated in FIG. 1.

The pressure sensor connector 10 is intended for use with a pressure sensor element 12 (see FIG. 2). Pressure sensors are well known in the automotive industry as well as other industries. Commonly pressure sensors are devices that convert pressure values or changes in pressure into electrical signals, and contain a plurality of pressure sensor terminals 13. Often these pressure sensor elements 12 are used in connection with a base 14 containing a port 16 through which the pressure of a working fluid is monitored by the pressure sensor element 12. Although the pressure sensor element 12 is illustrated in connection with a base 14 and a port 16, it should be understood that a wide variety of methods are known to place a pressure sensor element 12 in connection with a pressure source and are contemplated by this invention. It is common in many situations to utilize a pressure sensor connector to allow electrical connections to the pressure sensor terminals to be easily made.

The pressure sensor connector 10 includes a cap 18. A plurality of connector terminals 20 are positioned within the cap 18. The plurality of connector terminals 20 allow the pressure sensor connector 10 to be easily connected and disconnected from other components. This is commonly accomplished through the use of a wire harness, although a variety of known methods are contemplated. An alignment or key 21 may be used to insure proper alignment during installation of cap 18. The use of keys 21 and other alignment features is well known in the prior art. Although the cap 18 and the plurality of connector terminals 20 are depicted in a standard male configuration, it should be understood that a wide variety of configurations are contemplated, including female configurations.

One of the purposes of the pressure sensor connector 10 is to provide a convenient electrical conduit to the plurality of pressure sensor terminals 13 from the plurality of connector terminals 20. In the past, such a connection could require electrical conduits formed within the cap 18 and wire bonds to connect the pressure sensor terminals 13 to the plurality of connector terminals 20. The present invention eliminates this often costly and complex arrangement. The present invention uses a small terminal unit or adapter referred to as a frame element 22 to create a simple junction for the plurality of connector terminals 20 and thereby eliminates the need for complex electrical conduits formed within the cap and the use of wire bonding.

Figure 3:
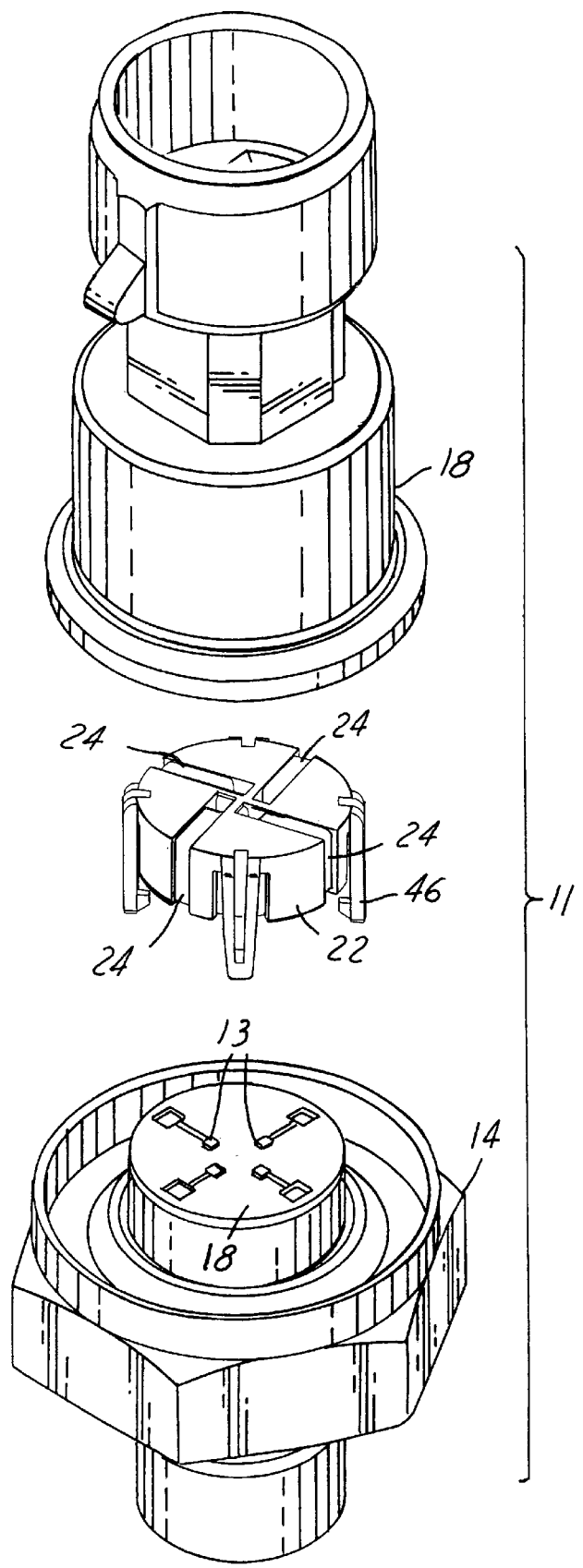
FIG. 3 is an exploded view of an embodiment of a pressure sensor assembly in accordance with the present invention.

Referring now to FIG. 3, which is an exploded view of an embodiment of a pressure sensor assembly 11, including pressure sensor connector 10 in accordance with the present invention. The pressure sensor connector 10 includes a frame element 22. Although a single embodiment has been illustrated, it should be understood that a wide variety of other forms of the frame elements 22 are contemplated. Although the frame element 22 may be manufactured using a wide variety of techniques and materials, in one embodiment the frame element 22 is injection molded utilizing a high temperature resin. High temperature resin can allow the frame element 22 to be subjected to solder reflow or oven epoxy cure temperatures without damage. The frame element 22 includes a plurality of contacts 24. Each of the plurality of contacts 24 is used to electrically connect one of the plurality of connector terminals 20 to a corresponding pressure sensor terminal 13 (see also FIG. 1). The frame element 22 provides a variety of benefits to the pressure sensor connector 10. The frame element 22 provides a compact adapter for the pressure sensor terminals 13 to connect to the connector terminals 20. The frame element 22 may further be easily sealed to form a closed container structure for the pressure sensor element 12 to prevent damage to the pressure sensor terminals 13 stemming from harsh and corrosive environments. This provides an inexpensive and reliable method of protecting the pressure sensor terminals 13 from exposure damage, and may be preferable to methods filling the entire cap 18 with sealant. Filing the entire cap 18 with sealant can require vent ports and fill ports within the cap 18 and may require a greater quantity of sealant than required by the present invention which may result in undesirable cost increases to the manufacturing of the pressure sensor assembly 11.

The plurality of contacts 24 can be connected to the plurality of connector terminals 20 and the plurality of pressure sensor terminals 13 through a variety of known methods. In one embodiment, the connection is made using electrically conductive adhesive. In another embodiment, the connection is made through the use of solder. In still another embodiment, the contacts 24 are connected to the plurality of pressure sensor terminals 13 through the use of solder and are connected to the plurality of connector terminals 20 through press-fit when the cap 18 is inserted onto the frame 22. Although several connection methods have been described, it should be understood that a wide variety of connection methods are contemplated, such as welding, perhaps by laser, brazing, or simple interference fit pressure contact to name just a few. The gap between the pressure sensor 12 and the frame element 22 may also be filled with passivation adhesive 30. The use of passivation adhesive 30 is a well known technique in protecting metal parts from damage due to harsh and corrosive environments.

Figure 4:
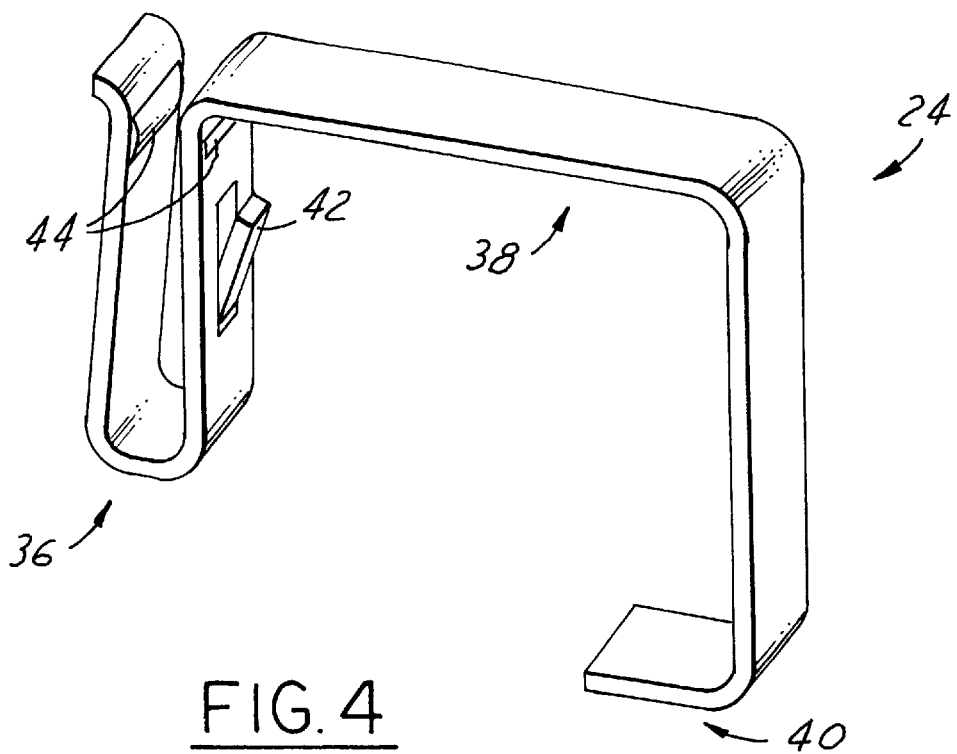
FIG. 4 is a detail of an embodiment of a contact for use in a pressure sensor assembly in accordance with the present invention.
Figure 5:
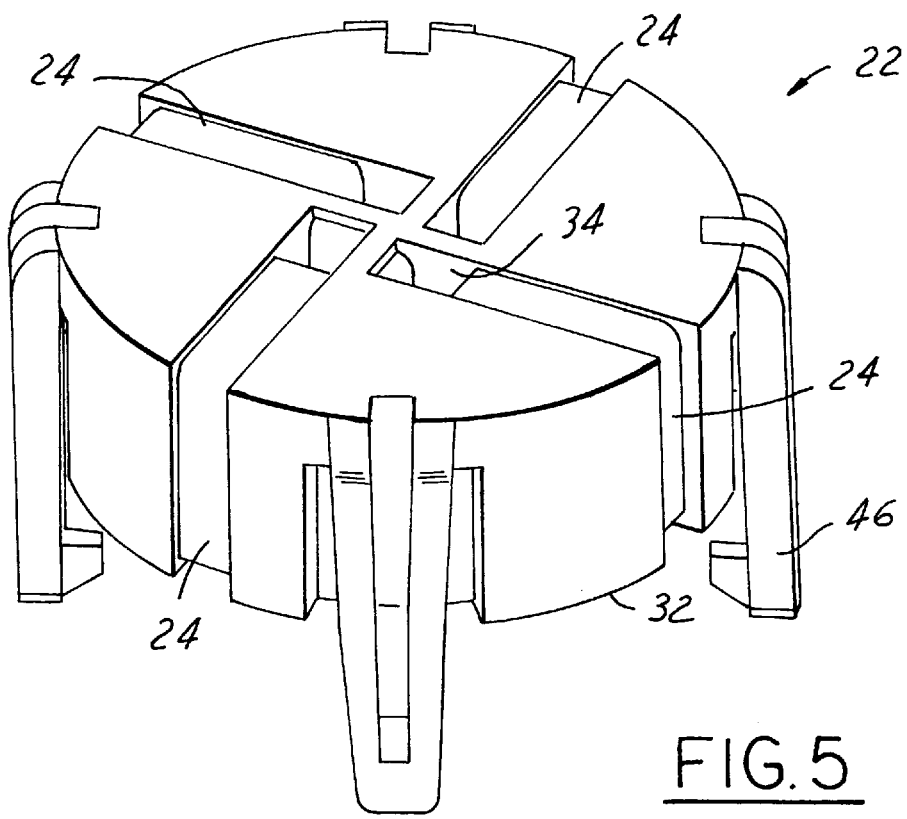
FIG. 5 is a detail of an embodiment of a frame element in accordance with the present invention.

Although the frame element 22 may be manufactured in a wide variety of configurations and through a wide variety of processes, in one embodiment the frame element 22 may include a frame element base 32. The frame element base 32 is preferably formed of high temperature resin, although a variety of materials may be used. The frame element base 32 is formed with slots 34 to facilitate the mounting of the plurality of contacts 24 onto the frame element 22. Each of the plurality of slots 34 extends from the top surface 50 down the outer side surface 52 to the bottom surface 54 of the frame element 32. The plurality of contacts 24 (see FIG. 4) can be formed with a pocket end 36, a contact body portion 38 and a terminal contact end 40. This allows the pocket end 36 to sit within the slot 34 on the top surface 50, the contact body portion to wrap around from the top surface 50, down the outer side surface 52 to the bottom surface 54 of the frame element base 32, and the terminal contact end 40 to provide a surface on the bottom surface 54 to attach to the pressure sensor terminals 13. The pocket end 36 provides a secure and reliable mating surface for one of the plurality of connector terminals 20. This configuration of contact 24 is easily manufactured and assembled. The contact 24 may also include additional features such as a locking mechanism 42 to secure the contact 24 to the frame element base 32 after installation and contact grips 44 to help provide reliable electronic communication with the connector terminals 20. In one embodiment, the frame element base 32 may further include locking tabs 46 to secure the frame element 22 to the pressure sensor element 12. Again, although a specific configuration of frame element 22 has been described, a wide variety of frame element 22 configurations are contemplated by the present invention.

The present invention is highly useful in reducing the cost and complexity of many current designs. The use of the frame element 22 facilitates the use of electrical connection techniques such as electrically conductive adhesive, solder, and other techniques that are less complex and have reduced costs when compared to wire bonding. The use of laser welding can reduce contamination concerns and improve interconnect reliability. In addition, the frame 22 eliminates the need for complex and costly electrical conduits to be formed within the cap of the pressure sensor connector 10. The frame element 22 provides a simplistic connection to the cap for easy and inexpensive installation. The frame element 22 also provides easy visual inspection of the electrical joints prior to installation of the cap 18 and thereby increases manufacturing reliability. Although several advantages of the present invention have been described, a wide variety of advantages and uses of the present invention are contemplated.

While particular embodiments of the invention have been shown and described, numerous variations and alternate embodiments will occur to those skilled in the art. Accordingly, it is intended that the invention be limited only in terms of the appended claims.

What is claimed is:

1. A pressure sensor assembly comprising:

a pressure sensor element including a plurality of pressure sensor terminals;

a cap;

a plurality of connector terminals formed within said cap;

a frame element, affixed to said pressure sensor element, including a plurality of slots extending from a top surface, down an outer side surface, to a bottom surface of said frame element; a plurality of contacts positioned within said slots, each including a pocket end positioned on said top surface, a contact body portion extending from said top surface down said outer surface to said bottom surface, and a terminal contact end positioned on said bottom surface, each of said plurality of contacts connecting one of said plurality of connector terminals to a corresponding pressure sensor terminal; and a plurality of locking tabs formed on said outer side surface, said plurality of locking tabs locking said frame element into contact with said pressure sensor element.

2. A pressure sensor assembly as described in claim 1 wherein said frame element is at least partially formed using high temperature resin.

3. A pressure sensor connector as described in claim 1 wherein said frame element is attached to said pressure sensor terminals through the use of reflow solder.

4. A pressure sensor assembly as described in claim 1 wherein said frame element is connected to said pressure sensor terminals through the use of electrically conductive epoxy.

5. A pressure sensor assembly as described in claim 1 further comprising passivation adhesive positioned between said frame element and said pressure sensor element.

6. A pressure sensor assembly as described in claim 1 further comprising a key element to facilitate alignment of said cap.

7. A pressure sensor assembly as described in claim 1 wherein said frame element protects said plurality of pressure sensor terminals from exposure.

8. A pressure sensor assembly comprising:

a pressure sensor element including a plurality of pressure sensor terminals;

a cap;

a plurality of connector terminals formed within said cap;

a frame element having a top surface, an outer side surface, and a bottom surface, said frame element affixed to said pressure sensor element and protecting said pressure sensor terminals from exposure, said frame element including a plurality of slots; and a plurality of contacts positioned within said slots, each of said plurality of contacts having a pocket end positioned on said top surface, a contact body portion extending from said top surface, down said outer side surface to said bottom surface and a terminal contact end positioned on said bottom surface, said pocket end providing a mating surface for one of said plurality of connector terminals, and said terminal contact end in electrical communication with a corresponding pressure sensor terminal.

9. A pressure sensor assembly as described in claim 8 wherein said frame element is at least partially formed using high temperature resin.

10. A pressure sensor assembly as described in claim 8 wherein said frame element is attached to said pressure sensor terminals through the use of reflow solder.

11. A pressure sensor assembly as described in claim 8 wherein said frame element is connected to said pressure sensor terminals through the use of electrically conductive epoxy.

12. A pressure sensor assembly as described in claim 8 further comprising passivation adhesive positioned between said frame element and said pressure sensor element.

13. A pressure sensor assembly as described in claim 8 wherein each of said plurality of contacts further includes a locking mechanism to secure each of said plurality of contacts within one of said slots.

14. A pressure sensor assembly as described in claim 8 wherein each of said plurality of contacts further includes contact grips.

15. A pressure sensor assembly as described in claim 8 further comprising locking tabs formed on said outer side surface to facilitate securing said frame element to said pressure sensor prior to assembly of said cap.

16. A pressure sensor assembly as described in claim 8 further comprising a plurality of laser weld pads attached to said plurality of pressure sensor terminals, wherein said plurality of contacts are attached to said laser weld pads by laser welding.

17. A method of assembling a pressure sensor assembly, including a cap having a plurality of connector terminals and a pressure sensor element having a plurality of pressure sensor terminals, comprising the steps of:

snapping a plurality of contacts onto a frame element, each of said plurality of contacts positioned with one of a plurality of slots formed onto said frame element, each of said plurality of contacts extending from a top surface down an outer side surface and to a bottom surface of said frame element; and pressing said frame element onto the press-re sensor element such that a plurality of locking tabs formed on said outer side surface secure said frame element to the pressure sensor element, said plurality of contacts thereby engaging the plurality of pressure sensor terminals; inserting the cap onto said frame element such that the plurality of connector terminals are in communication with said plurality of contacts.

18. A method of assembling a pressure sensor assembly as described in claim 17, further comprising the step of:

inserting a passivation adhesive between said frame element and the pressure sensor element.

19. A method of assembling a pressure sensor assembly as described in claim 17, wherein attaching said frame element to the plurality of pressure sensor terminals is accomplished through the use of solder.

20. A method of assembling a pressure sensor assembly as described in claim 17, wherein attaching said frame element to the plurality of pressure sensor terminals is accomplished through the use of electrically conductive adhesive.

21. A method of assembling a pressure sensor assembly as described in claim 17, wherein attaching said frame element to the plurality of pressure sensor terminals is accomplished by a method chosen from the group of soldering, welding, laser welding, and brazing.

* * * * *